US012412317B2

(12) United States Patent
Bourquin et al.

(10) Patent No.: US 12,412,317 B2
(45) Date of Patent: Sep. 9, 2025

(54) PREDICTING THE APPEARANCE OF A USER FOLLOWING TREATMENT

(71) Applicant: KONINKLIJKE PHILIPS N.V., Eindhoven (NL)

(72) Inventors: Yannyk Parulian Julian Bourquin, Eindhoven (NL); Jonathan Alambra Palero, Waalre (NL); Lu Wang, Eindhoven (NL); Babu Varghese, Eindhoven (NL); Mustafa Tolga Eren, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 71 days.

(21) Appl. No.: 17/924,132

(22) PCT Filed: Jun. 2, 2021

(86) PCT No.: PCT/EP2021/064732
§ 371 (c)(1),
(2) Date: Nov. 9, 2022

(87) PCT Pub. No.: WO2021/249837
PCT Pub. Date: Dec. 16, 2021

(65) Prior Publication Data
US 2023/0177741 A1 Jun. 8, 2023

(30) Foreign Application Priority Data

Jun. 9, 2020 (EP) .................................... 20178895

(51) Int. Cl.
G06T 11/00 (2006.01)
B26B 19/38 (2006.01)
B26B 21/40 (2006.01)

(52) U.S. Cl.
CPC ............. *G06T 11/00* (2013.01); *B26B 19/388* (2013.01); *B26B 21/4056* (2013.01)

(58) Field of Classification Search
CPC . G06T 11/00; G06T 7/73; G06T 2207/30201; B26B 19/388;
(Continued)

(56) References Cited

U.S. PATENT DOCUMENTS 1,025,131 A 5/1912 Donnell
10,259,131 B2 4/2019 Krenik
(Continued)

FOREIGN PATENT DOCUMENTS

CN 108021044 A 5/2018
EP 3366195 A1 8/2018
(Continued)

OTHER PUBLICATIONS

Wu et al., "Look at Boundary: A Boundary-Aware Face Alignment Algorithm", Tsinghua National Laboratory for Information Science and Technology (TNList), Department of Computer Science and Technology, Tsinghua University Sense Time Research, Amazon Rekognition, May 26, 2018.
(Continued)

*Primary Examiner* — Wesner Sajous

(57) ABSTRACT

According to an aspect, there is provided an apparatus comprising a processor configured to receive image data in respect of a user (102) of a personal care device (104), wherein the personal care device is to be used to treat a portion of the user; receive device operating data relating to the personal care device; determine position information of at least a treatment element (112) of the personal care device relative to the user; generate, based on the received image data, the received device operating data and the determined position information, an image (120) representative of a
(Continued)

predicted appearance of the portion of the user following treatment using the personal care device; and provide the generated image for display on a representation of the user.

18 Claims, 8 Drawing Sheets

(58) Field of Classification Search
CPC ............ B26B 21/4056; B26B 21/4087; B26B 21/4081; G06F 3/0304; G06F 3/012; G06F 3/011; G06F 3/0481; G06F 3/0346; A45D 27/42; A45D 44/00; A45D 44/005; A45D 40/30; A45D 42/00; A45D 42/08; G06V 40/161; G06V 10/235; H04N 23/611; H04N 23/635
See application file for complete search history.

(56) References Cited

U.S. PATENT DOCUMENTS

| | | |
|---|---|---|
| 2015/0055085 A1 | 2/2015 | Fonte et al. |
| 2015/0321365 A1 | 11/2015 | Lauritsen |
| 2016/0262521 A1 | 9/2016 | Kustra et al. |
| 2019/0053607 A1* | 2/2019 | Shen .................... G06F 3/04842 |
| 2019/0152075 A1* | 5/2019 | Hoexum ................. A45D 27/42 |
| 2020/0069034 A1* | 3/2020 | Godlieb .................. G06T 11/00 |
| 2020/0316799 A1* | 10/2020 | Tsegenidis .......... B26B 21/4087 |

FOREIGN PATENT DOCUMENTS

| | | | |
|---|---|---|---|
| WO | 2018007547 A1 | 1/2018 | |
| WO | 2018104356 A1 | 6/2018 | |
| WO | WO-2018149738 A1 * | 8/2018 | ............. B26B 19/20 |
| WO | 2019001894 A1 | 1/2019 | |

OTHER PUBLICATIONS

Hawkins et al., "Assistive Mobile Manipulation for Self-Care Tasks Around the Head".
International Search report and Written Opinion of PCT/EP2021/064732 dated Oct. 15, 2021.

* cited by examiner

PREDICTING THE APPEARANCE OF A USER FOLLOWING TREATMENT

CROSS-REFERENCE TO PRIOR APPLICATIONS

This application is the U.S. National Phase application under 35 U.S.C. § 371 of International Application No. PCT/EP2021/064732, filed on Jun. 2, 2021, which claims the benefit of European Patent Application No. 20178895.7, filed on Jun. 9, 2020. These applications are hereby incorporated by reference herein.

FIELD OF THE INVENTION

The invention relates to personal care and, more particularly, to predicting the appearance of a user of a personal care device following use of the device.

BACKGROUND OF THE INVENTION

When performing a personal care activity, such as shaving or trimming hair, it is often desirable to perform the particular activity accurately in order to achieve the desired result. For example, when trimming a beard, a user may intend that the beard is trimmed similarly on both sides of the face, and may intend for the beard to appear symmetrical.

To aid the user, the user may perform the personal care activity in front of a mirror, so that they can view their reflection, or in front of a device capable of displaying a live image of the user while the activity is performed. Even then, it may be difficult to know what the result will be of performing the personal care activity.

SUMMARY OF THE INVENTION

In contrast to existing systems, embodiments of this disclosure provide a mechanism by which a user can see a visual prediction of an outcome of a personal care activity before the activity has been performed. The inventors have recognised that, by using various pieces of data, it is possible to generate an image illustrating an effect of using a personal care device, such that a user can see the effect of the device before it is used. For example, a user of a shaving device may be able to view a representation of their face which includes a modification to illustrate how the user's face might look if the shaving device is applied to a particular portion of their face. In this way, the user is able to make a decision regarding whether or not to proceed with the treatment (e.g. shaving procedure) before any irreversible changes have been made. Moreover, by displaying the predicted modification on a representation of the user's face at a position based on the position of the personal care device, the user may be able to position the device more accurately in an intended position, thereby making easier for the user to perform personal care activity as intended.

According to a first specific aspect, there is provided an apparatus comprising a processor configured to receive image data in respect of a user of a personal care device, wherein the personal care device is to be used to treat a portion of the user; receive device operating data relating to the personal care device; determine position information of at least a treatment element of the personal care device relative to the user; generate, based on the received image data, the received device operating data and the determined position information, an image representative of a predicted appearance of the portion of the user following treatment using the personal care device; and provide the generated image for display on a representation of the user.

According to some embodiments, the processor may be further configured to determine, based on the received image data, a degree of deformation of a surface of the user by the personal care device. The processor may be further configured to generate the image representative of the predicted appearance of the portion of the user further based on the determined degree of deformation of the surface of the user.

The processor may, in some embodiments, be configured to generate the image representative of the predicted appearance of the portion of the user further based on an output of a sensor of the personal care device.

In some examples, the device operating data may comprise a size of the treatment element of the personal care device. The processor may be configured to generate the image representative of the predicted appearance of the portion of the user having a size based on the size of the treatment element.

The device operating data may comprise data indicative of an orientation and/or a motion of the personal care device. The processor may be configured to generate the image representative of the predicted appearance of the portion of the user having a size based on the orientation/motion data.

In some examples, the processor may be further configured to determine, based on the received image data, an indication of the body part of the user that is to be treated using the personal care device. The processor may be further configured to generate the image representative of the predicted appearance of the portion of the user having a size based further on the indication of the body part.

In some embodiments, the apparatus may comprise an interactive mirror, a desktop computer, a laptop computer, a tablet computer, a smartphone or a wearable device.

According to a second aspect, there is provided a computer-implemented method comprising receiving image data in respect of a user of a personal care device, wherein the personal care device is to be used to treat a portion of the user; receiving device operating data relating to the personal care device; determining position information of at least a treatment element of the personal care device relative to the user; generating, based on the received image data, the received device operating data and the determined position information, an image representative of a predicted appearance of the portion of the user following treatment using the personal care device; and displaying the generated image on a representation of the user.

The computer-implemented method may further comprise displaying the representation of the user and the generated image on the representation of the user in an alternating manner.

In some embodiments, the computer-implemented method may further comprise determining, based on the received image data, an amount of deformation of a surface of the user by the personal care device. Generating the image representative of the predicted appearance of the portion of the user may be further based on the determined amount of deformation of the surface of the user.

According to third aspect, there is provided a computer program product comprising a non-transitory computer-readable medium, the computer-readable medium having computer-readable code embodied therein, the computer-readable code being configured such that, on execution by a suitable computer or processor, the computer or processor is caused to perform steps of the methods disclosed herein.

According to a fourth aspect, there is provided a personal care system comprising a personal care device having a treatment element to be used to treat a portion of a user; an image capture device configured to capture image data in respect of the user of the personal care device; a display unit; and processing apparatus configured to operate the image capture device to capture image data in respect of the user of the personal care device; receive device operating data relating to the personal care device; determine position information of at least the treatment element of the personal care device relative to the user; generate, based on the captured image data, the received device operating data and the determined position information, an image representative of a predicted appearance of the portion of the user following treatment using the personal care device; and provide the generated image for display on a representation of the user on the display unit.

In some examples, the personal care device may comprise a first sensor configured to measure a force or pressure applied to the user by the personal care device. The processing apparatus may be configured to generate the image representative of the predicted appearance of the portion of the user further based on an output of the first sensor.

The personal care device may, in some in bottoms, comprise a second sensor configured to measure orientation data and/or motion data in respect of the personal care device. The processing apparatus may be configured to generate the image representative of the predicted appearance of the portion of the user further based on an output of the second sensor.

In some examples, the personal care device may comprise a device selected from a group comprising: a hair trimming device, a shaving device, a hair treatment device, a photoepilation device, a skin treatment device, a skin rejuvenation device and a product application device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

According to various embodiments of the invention, methods, apparatuses, systems and computer program products are provided that enable a user of a personal care device to view a visual indication of the effect of performing the personal care activity before the activity has been performed. Various embodiments are described in the context of personal care activities performed using personal care devices, such as haircare devices and skin care devices. However, it will be appreciated that the disclosed embodiments may be implemented using any type of personal care device.

Figure 1:
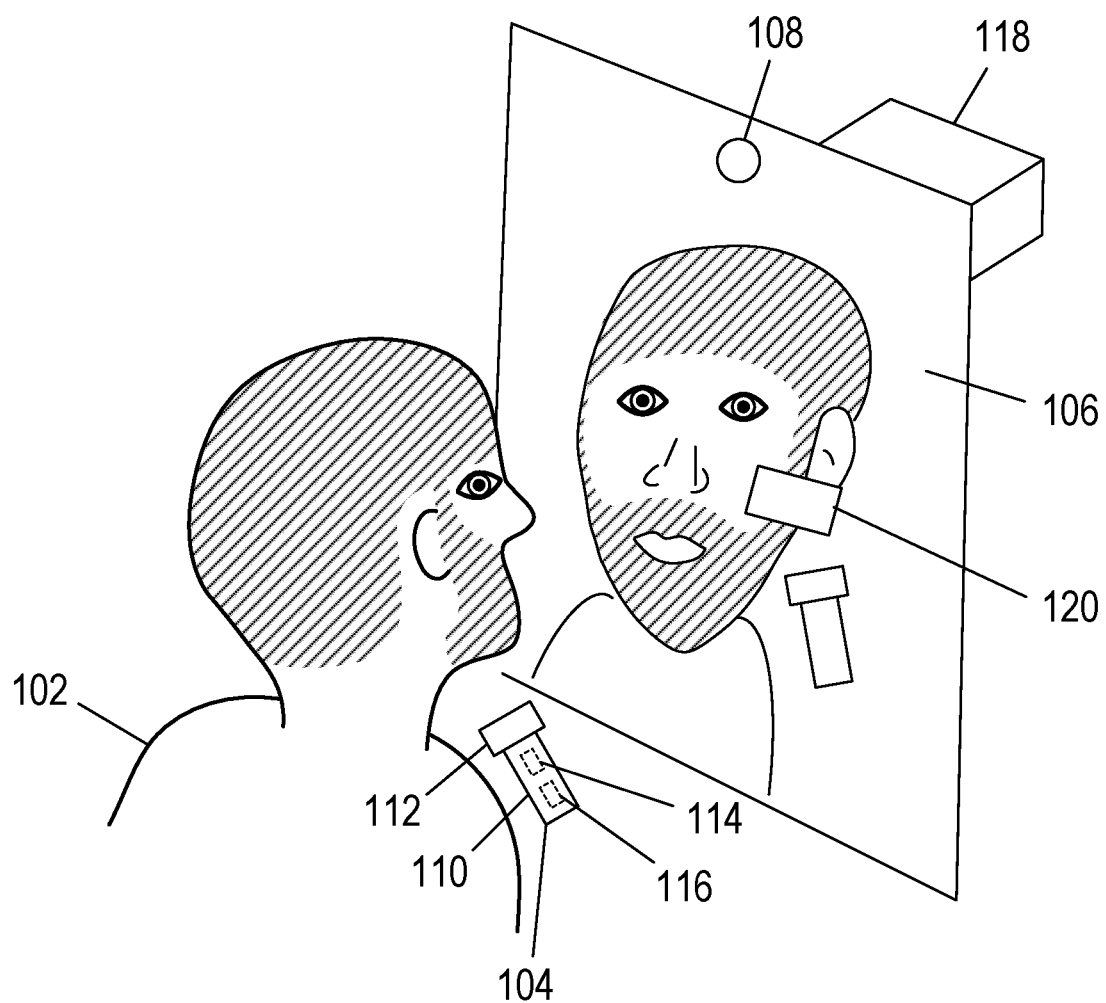
FIG. 1 is an illustration of user performing a personal care activity.

Referring to the drawings, FIG. 1 is an illustration of a user 102 of a personal care device 104. In this example, the personal care device 104 comprises a shaving device of the type used to shave hair, for example from the face of the user 102. In some cases, particularly when the user 102 cannot directly view the portion of their body being treated, the user may perform personal care activities (e.g. shaving) in front of a mirror so that they can position the personal care device 104 more accurately, to make it easier to achieve the desired outcome. In the example shown in FIG. 1, the user 102 is performing the personal care activity in front of a display device 106 capable of displaying a representation of at least part of the user, for example a reflection of the user or a representation of the user that has been captured using a camera.

In some examples, the display device 106 may comprise an interactive mirror. An interactive mirror, sometimes referred to as a smart mirror, is a unit which, in addition to functioning as a mirror to show a user his or her reflection, is also capable of displaying information to the user. Information, such as text, images and videos, may be displayed on a display portion of the interactive mirror which may, for example, be positioned behind a mirrored (or partially mirrored) panel or a mirrored (or partially mirrored) surface. In this way, the display screen, or portions thereof, may be visible through the mirror portion, so that a user is able to simultaneously view their reflection and information presented on the display screen. The interactive mirror 106 may include one or more sensors, such as an imaging device 108 (e.g. a camera) capable of capturing an image (e.g. of the user 102) which can be displayed on the screen of the interactive mirror or used for determining data (e.g. device position data) as explained below. The interactive mirror 106 may be connected (wirelessly or via a wired connection) to one or more other devices, such as the personal care device 104. The processing circuitry within the interactive mirror 106 may receive data from the personal care device 104 (and/or from other connected devices) and may display information to the user relating to the connected device.

In other examples, an alternative display device 106 may be used by the user 102 instead of an interactive mirror. For example, the user 102 may perform the personal care activity in front of a smart phone, a tablet computer, a laptop computer, or some other display device capable of displaying a representation of the user along with other information. For example, the camera 108 may form part of the display device or may be a separate device that is connected to the display device 106.

The personal care device 104 may comprise a body 110 and a treatment element 112 for performing the intended treatment of the personal care device. For example, in a shaving device, the treatment element 112 may comprise a shaving head having blades that cut hair during use. The body 110 of the personal care device 104 may house various components. In some examples, the personal care device 104 may include one or more sensors, such as a first sensor 114 and/or a second sensor 116 for measuring data relating to the personal care device and/or its use.

Various steps of the methods disclosed herein may be performed using one or more processors, such as a processor 118, which may form part of a computing device or cloud computing environment connected to the display device 106. In examples where the display device 106 comprises part of a computing device (e.g. a smartphone or tablet computer), the processor 118 may also form part of the computing device. In the example shown in FIG. 1, the processor 118 forms part of the interactive mirror 106. According to embodiments of the invention, during use of the personal care device 104, the processor 118 may use various data (e.g. image data acquired using the camera 108 and/or data acquired using the sensors 114, 116) to generate an image 120 that represents the predicted appearance of part of the user 102 following treatment using the personal care device 104. The generated image 120 may comprise a patch that can be displayed on the display device 106 with the representation (e.g. the reflection or the generated representation) of the user 102. For example, the generated image 120 may be presented as an overlay or a superimposed region on the display device 106. In this way, the user 102 is able to view themselves (i.e. the representation of them) and, at the same time, see a prediction of what they will look like if they continue to use the personal care device 104 in a particular region.

In some embodiments, the generated image 120 may be displayed on the display device 106 as the personal care device 104 approaches the user 102 (e.g. when the personal care device is within a defined threshold distance of the user) but before the treatment element 112 of the personal care device treats the user. Moreover, the position of the generated image 120 relative to the representation of the user 102 on the display device 106 may be based on the position of the personal care device 104 or the position of the treatment element 112 that the personal care device, such that movement of the treatment element 112 results in movement of the image 120 on the display device. Thus, prior to performing the personal care activity, which may result in irreversible changes being made, the user 102 may view the predicted outcome shown by the generated image 120 and decide whether or not to proceed with the personal care activity.

Figure 2:
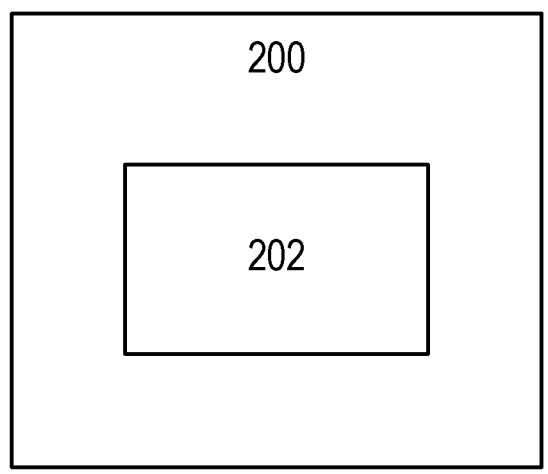
FIG. 2 is a schematic illustration of an example of an apparatus according to various embodiments.

According to a first aspect, the present invention provides an apparatus. FIG. 2 is a schematic illustration of an example of an apparatus 200 may be used in the implementation of embodiments of the invention. The apparatus 200 comprises a processor 202 The processor 202 may comprise or be functionally similar to the processor 118. The apparatus 200 may comprise or form part of a computing device such as a smartphone or a tablet computer, or may comprise or form part of an interactive mirror. The processor 202 is configured to receive image data in respect of a user 102 of a personal care device 104, wherein the personal care device is to be used to treat a portion of the user. The image data may, for example, be acquired from an image capture device or camera 108 forming part of a computing device or interactive mirror, or from an image capture device or camera that is separate from, but capable of delivering image data to, the apparatus 200. The image data, which may be captured using known image capture techniques, in any known image format, may include part of the user 102 and, in some examples, may also include some or all of the personal care device 104. In examples where an image of at least part of the personal care device 104 is captured in addition to an image of at least part of the user 102, it may be possible to determine information from the image data, such as data indicative of relative position, orientation and/or movement of the personal care device 104 and the user 102.

The camera 108 may comprise a 2D or 3D camera (e.g. a stereo camera) and may be capable of using techniques such as time of flight measurement. Data acquired using the camera 108 may be used to create a 2D and/or 3D model of at least part of the user 102. Determination of the location and/or orientation of the personal care device 104 relative to the user 102 (sometimes referred to as device tracking) may be achieved by monitoring the position of the user in the captured image. When the user's face is captured in the image data, the face position and orientation may be detected using facial landmarks (e.g. points of the eyes, nose mouth, and so on). The positions of the landmarks are then incorporated onto a pre-recorded 3D facial model of the user 102. The position and/or orientation of the personal care device 104 may be obtained by detecting landmarks on the personal care device (e.g. reference points or corners of the device), sometimes referred to as device landmarks. These device landmarks may be inherent of the device aspect or may be specifically integrated into the personal care device to improve the tracking ability (e.g. green dots at specific positions on the device). The device landmarks may be analysed with respect to the facial landmarks of the user 102 to provide data indicative of the position and/or orientation of the personal care device relative to the portion of the user 102 (e.g. the face).

The processor 202 is also configured to receive device operating data relating to the personal care device 104. Device operating data may comprise data indicative of the type or nature of the personal care device 104 being used, and/or details of the treatment element 112 being used on the personal care device. For example, device identification data may indicate the type of personal care device being used, and/or parameter information may indicate settings (e.g. cutting length). In some embodiments, device operating data may include data acquired using one or more sensors associated with the personal care device 104. For example, device operating data may be acquired from a sensor or sensors located within the personal care device 104 or from a sensor or sensors external to but associated with the personal care device. In other examples, device operating data may include data relating to a position, orientation and/or movement of the device relative to a reference, such as the apparatus 200 or the user 102. Thus, the device operating data may be data that has been stored in respect of the personal care device 104 prior to the use of the device or data that is acquired in real-time during the use of the personal care device.

The device operating data may be received from the personal care device 104 itself or from a storage (e.g. a memory) associated with the processor 202, in which such data is stored. For example, the memory may store a database containing device operating data in respect of several personal care devices 104.

The processor 202 is further configured to determine position information of at least a treatment element 112 of the personal care device 104 relative to the user 102. Position information may include a location or position of at least the treatment element 112 relative to a reference point or object, such as a portion of the user 102 or the apparatus 200, an orientation of at least the treatment element relative to the reference point or object, a distance from at least part of the treatment element to the reference point or object and/or an indication of a direction of motion of at least the treatment element relative to the reference point or object. The position information may be determined from the image data received in respect of user of the personal care device 104 and/or from one or more other sources, such as the device operating data and sensors within the personal care device.

The processor 202 is further configured to generate, based on the received image data, the received device operating data and the determined position information, an image 120 representative of a predicted appearance of the portion of the user 102 following treatment using the personal care device 104. The processor 202 is further configured to provide the generated image for display on a representation of the user 102. For example, the image 120 and the representation of the user may be presented on the display 106. In examples where the display 106 forms part of a computing device, such as a smartphone or tablet computer, the representation of the user 102 may be an image or live video footage of the user (i.e. image data) acquired using the image capture device 108. In examples where the display 106 forms part of an interactive mirror, then the representation of the user 102 may be a reflection of the user in the mirror.

The image 120 representing the predicted appearance of the portion of the user 102 may generally be smaller than the display 106 on which the representation of the user 102 is presented, and may be sized so that it is smaller than the representation of the user. The image 120 may be considered to be a patch or mask (e.g. square or rectangular in shape) that is intended to cover or replace a portion of the representation of the user. For example, if the user 102 is performing a shaving activity to shave one of their sideburns, then the image 120 generated by the processor 202 may comprise a patch (e.g. rectangular) representing the appearance of a portion of the side of the user's face that is intended to be shaved using the personal care device 110 (e.g. a shaver). The image 120 may comprise a representation of the user's skin with no hair or shorter hair, and this may be presented to the user 102 as a mask, overlay or otherwise superimposed on the representation of the user on the display 106.

To generate the image representative of the predicted appearance of the portion of the user 102 following treatment, the processor 202 may, in some embodiments, use prestored data (e.g. data stored in a memory) indicating or describing how a particular portion of the user might appear if the personal care activity is carried out. For instance, in the shaving examples, the generated image 120 may comprise a stored image of clean-shaven skin, so that the user 102 can see what a particular portion of their body might look like clean-shaven. A more accurate prediction of the appearance of the portion of the user may be made using additional data available to the processor 202. For example, data indicative of the user's skin color, tone, complexion and the like may be determined from the received image data, and the image 120 of the predicted appearance of the portion of the user 102 may be generated using such data, so that the generated image is more realistic.

Figure 3A:
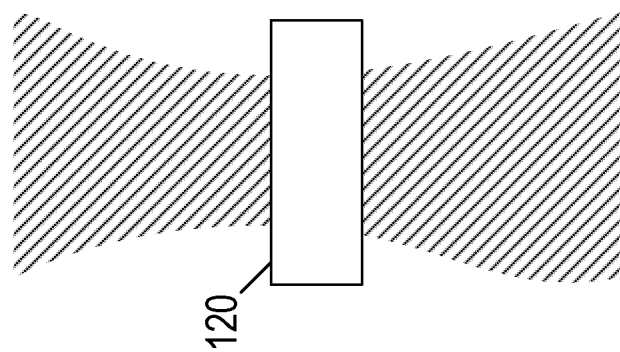
FIGS. 3A, 3B and 3C are illustrations of images generated according to various embodiments.
Figure 3B:
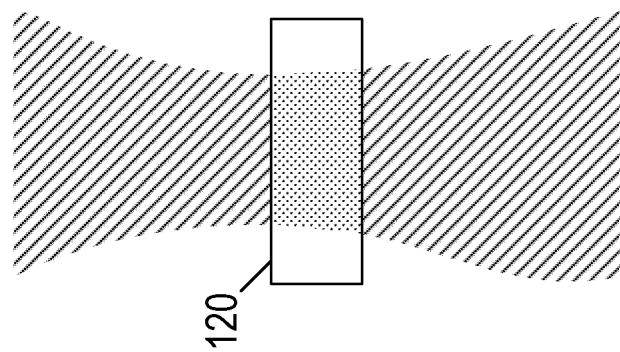
Figure 3C:
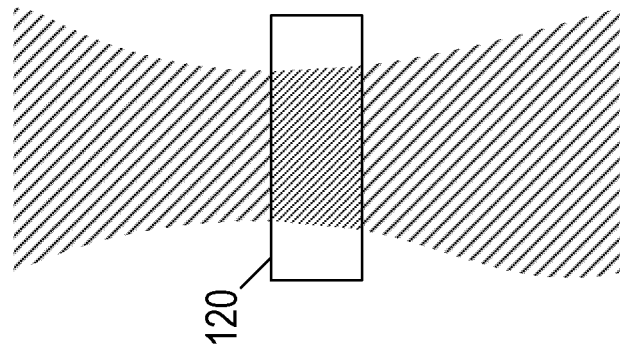

In some examples, device operating data relating to the personal care device (e.g. the shaver) 110 may be used to improve the prediction. FIG. 3 is an illustration of three different examples of images 120 generated using device operating data relating to the shaver. In each example, a sideburn of a user 102 is shown with part of the user's hair. In FIG. 3A, device operating data of the shaver may indicate that the treatment element 112 of the shaver is set to perform a clean-shave (e.g. with no shaving guide in place). In this example, therefore, the image 120 may show a clean-shaven portion of the user's skin to replace the sideburn. In FIG. 3B, device operating data of the shaver may indicate that the treatment element 112 of the shaver is set to cut the user's hair very short and, therefore, the image 120 may show a portion of the user's skin with stubble replacing the sideburn. In FIG. 3C, device operating data of the shaver may indicate that the treatment element 112 of the shaver is set merely to trim the user's hair and, therefore, the image 120 may show a portion of the user's skin with hair that is slightly shorter than the users current hair length in the sideburn region. In some examples, the device operating data indicating the nature of the treatment element 112 may be acquired automatically from the personal care device 104 while, in other examples, a user may provide (e.g. via user interface, not shown) details of the treatment element, such as an intended length of cut.

Figure 4:
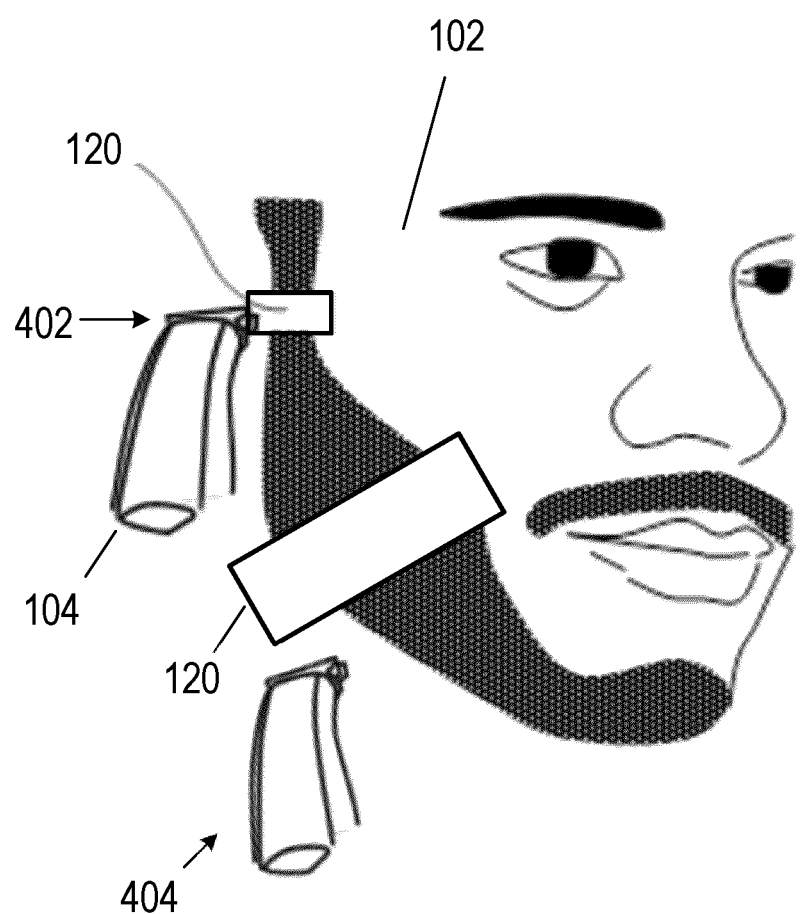
FIG. 4 is an illustration of images generated according to various embodiments.

An appearance (e.g. a size, shape and/or orientation) of the image 120 generated by the processor 202 may be based on data available to the processor 202 including, for example, the received image data, the received device operating data and/or the determined position information. FIG. 4 is an illustration of two different examples of the appearance of the image 120. In a first example, labelled 402, the generated image 120 is relatively small, covering a small proportion of the representation of the user 102. In a second example, labelled 404, the generated image 120 is relatively larger, covering a larger proportion of the representation of the user 102.

The processor 202 may determine from image data (e.g. from the camera 108) that the personal care device 104 is to be used to shave a sideburn of the user 102 in example 402 and used to shave a cheek of the user in example 404. In some examples, if a relatively smaller portion of the user is to be treated using the personal care device 104, then the generated image 120 may be relatively smaller (example 402) while if a relatively larger portion of the user is to be treated, then the generated image may be relatively larger (example 404). Device operating data relating to the personal care device 104 may indicate an orientation in which the personal care device 104 is being held relative to the head of the user 102. The orientation of the image 120 generated by the processor 202 may, in some examples, correspond to the orientation of at least part of the personal care device 104, such as the treatment element 112. Device operating data and/or position information of the treatment element 112 and/or the personal care device 104 may provide an indication of a speed of movement of the personal care device relative to the user 102. For example, when shaving a relatively smaller region such as a sideburn, the user 102 may move the personal care device 104 slower than when shaving a larger portion such as a cheek or a neck. In other examples, the received image data may be used to determine which part of the user 102 is to be treated using the personal care device 104, and this may be used to determine the size of the image 120. For example, the processor 202 may be configured to determine, based on the received image data, an indication of the body part of the user 102 that is to be treated using the personal care device 104. The processor 202 may be configured to generate the image 120 representative of the predicted appearance of the portion of the user 102 having a size based further on the indication of the body part.

When the personal care device 104 is determined to be moving relatively quickly, the generated image 120 may be relatively larger than when the personal care device is determined to be moving relatively slowly. Thus, the device operating data may comprise data indicative of an orientation and/or a motion of the personal care device 104. The processor 202 may be configured to generate the image 120 representative of the predicted appearance of the portion of the user 102 having a size based on the orientation/motion data. Various limits and thresholds may be defined and used by the processor 202 when determining the appearance of the image 120.

In some embodiments, the size of the image 120 may correspond to, or be based on details of the treatment element 112 of the personal care device 104. For example, the device operating data may comprise a size of the treatment element 112 of the personal care device 104. The processor 202 may be configured to generate the image 120 representative of the predicted appearance of the portion of the user 102 having a size based on the size of the treatment element 112.

The processor 202 may, in some embodiments, be configured to determine, based on the received image data, a degree of deformation of a surface of the user 102 by the personal care device 104. For example, some personal care devices may be used by touching a treatment element 112 of the personal care device 104 against the skin of the user 102 or pushing the treatment element against the skin of the user. Contact between the treatment element 112 (or any other part of personal care device 104) and a surface (e.g. the skin) of the user 102 may cause the surface to be deformed. Using the received image data (e.g. image data acquired using the camera 108), an amount or degree of deformation may be measured or determined, and this may be taken into account when generating the image 120. The image data may be used, for example, to determine a depth of the personal care device 104 in the 3D model of the user 102. In some embodiments, parameter information relating to the surface of the user may be used to improve the determination of the amount of deformation. For example, skin elasticity values at different positions on the user's body may be used. Known values of skin elasticity may be stored in a memory accessible to the processor 202, for example. In some examples, data indicating an ethnicity and/or an age of the user may be used to determine an amount of deformation of the skin. Thus, the processor 202 may be further configured to generate the image representative of the predicted appearance of the portion of the user 102 further based on the determined degree of deformation of the surface of the user. For example, if the received image data indicates that the skin of the user 102 has been deformed by the personal care device 104, then the image 120 generated by the processor 202 may show such deformation.

In other examples, deformation of the skin of the user 102 resulting from the personal care device 104 may be determined or measured in another way. For example, the first sensor 114 and/or the second sensor 116 may comprise a force sensor or a pressure sensor to measure an amount of force or pressure applied by the personal care device 104 onto a surface of the user 102. The data acquired using the sensor's 114, 116 may be used when generating the image 120. For example, an indication of an amount of force applied onto the skin of the user 102 may be used to predict an amount of deformation of the skin, and this deformation may be displayed in the image 120. Thus, the processor 202 may be configured to generate the image 120 representative of the predicted appearance of the portion of the user 102 further based on an output of a sensor 114, 116 of the personal care device 104.

Figure 5B:
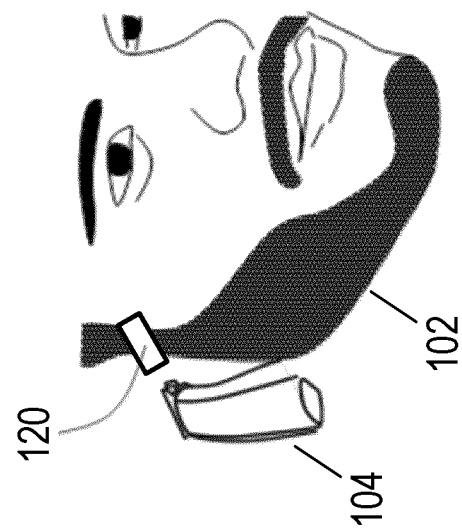
FIGS. 5A and 5B are illustrations of images showing various embodiments of the invention in use.
Figure 5B:
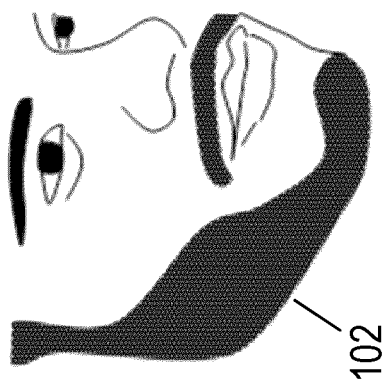
Figure 5A:
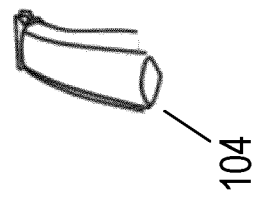

In some examples, the image 120 may be displayed on the representation of the user (e.g. on the display 106) only when certain conditions are met. For example, the image 120 may be displayed only if the personal care device 104 is determined to be within a defined threshold distance of the user 102. FIG. 5 is an illustration of two examples of representations of the user 102 and the personal care device 104 according to embodiments of the invention. In FIG. 5A, data available to the processor 202 (e.g. received image data, received device operating data and/or determined position information) may indicate that the personal care device 104 is beyond a threshold distance from the user 102. In this example, the image 120 may not be displayed on the representation of the user 102. In FIG. 5B, however, the data available to the processor 202 may indicate that the personal care device 104 is within a threshold distance from the user 102. In this example, the image 120 is displayed on the representation of the user 102. By displaying the image 120 only when the personal care device 104 is within a defined threshold distance of the user 102, the processor 202 may be able to determine an intended treatment location of the user to higher confidence level. Moreover, the user 102 may have some control over when the image 120 is to be displayed on the display 106. For example, if the user 102 wishes to view the representation without the image 120 overlay, then they may simply move the personal care device 104 away from their face.

As noted briefly above, the apparatus 200 may comprise or form part of a computing device. In some examples, the apparatus 200 may comprise an interactive mirror, a desktop computer, a laptop computer, a tablet computer, a smartphone or a wearable device (e.g. a smart watch).

Figure 6:
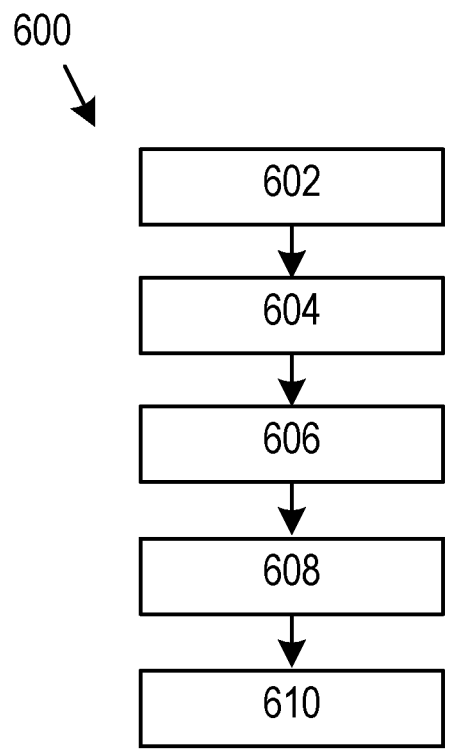
FIG. 6 is a flowchart of an example of a method according to various embodiments.

According to a second aspect, the present invention provides a method. FIG. 6 is a flowchart of an example of a method 600. The method 600, which may comprise a computer-implemented method, may be considered to be a method for predicting an appearance of the user following treatment using a personal care device. The method 600 comprises, at step 602, receiving image data in respect of a user 102 of a personal care device 104, wherein the personal care device is to be used to treat a portion of the user. At step 604, the method 600 comprises receiving device operating data relating to the personal care device 104. The method comprises, at step 606, determining position information of at least a treatment element 112 of the personal care device 104 relative to the user 102. At step 608, the method comprises generating, based on the received image data, the received device operating data and the determined position information, an image 120 representative of a predicted appearance of the portion of the user 102 following treatment using the personal care device 104. The method 600 comprises, at step 610, displaying the generated image 120 on a representation of the user 102. For example, the image 120 may be displayed on the display 106.

Figure 7:
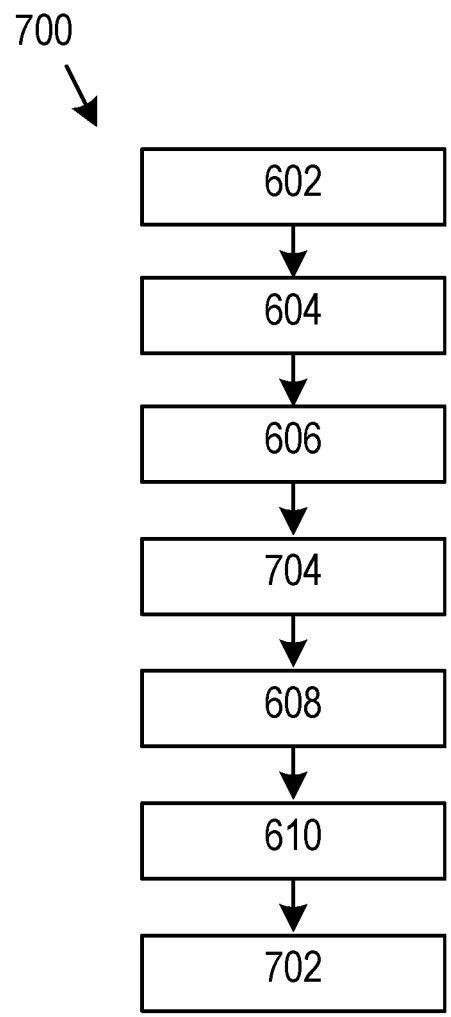
FIG. 7 is a flowchart of a further example of a method according to various embodiments.

FIG. 7 is a flowchart of a further example of a method 700. The method 700 may comprise a computer implemented method and may include one more steps of the method 600. The method 700 may comprise, at step 702, displaying the representation of the user 102 and the generated image 120 on the representation of the user in an alternating manner. Thus, the image 120 may be periodically displayed over the representation of the user 102 and removed, such that the image 120 repeatedly appears for a short period of time (e.g. 0.5 seconds or 1 second). In this way, the user 102 is able to compare how they currently look with how they might look if they proceed with the treatment using the personal care device 104.

In other embodiments, the display and/or removal from display of the image 120 may be controlled by the user 102. For example, the user 102 may perform a defined movement or gesture (e.g. using a finger, a hand, their head, a facial expression, or a defined movement of the personal care device) which may be captured using the camera 108 and interpreted as an indication that the user wishes to display or remove from display the image 120. In another example, a pause in movement of the personal care device 104 by the user 102 may be detected and recognised as a signal to display the image 120. In this way, a user may stop moving the personal care device 104 when a would like to understand what effect further movement of the device might have. In other embodiments, the display and/or removal from display of the image 120 may be effected via a user interaction with a user interface of the personal care device 104 or the computing device (e.g. the interactive mirror or tablet computer) housing the display 106. For example, the user 102 may press a button to switch between cases where the image 120 is displayed and not displayed.

At step 704, the method 700 may comprise determining, based on the received image data, an amount of deformation of a surface of the user 102 by the personal care device 104. For example, contact between the personal care device 104 and skin the user 102 may cause deformation of the skin, and the amount and nature of the deformation may be determined. Generating (step 608) the image 120 representative of the predicted appearance of the portion of the user 102 may be further based on the determined amount of deformation of the surface of the user. Thus, the image 120 generated at step 608 may include deformation of the surface.

One or more steps of the methods 600, 700 may be performed using the processor 202 of the apparatus 200.

Figure 8:
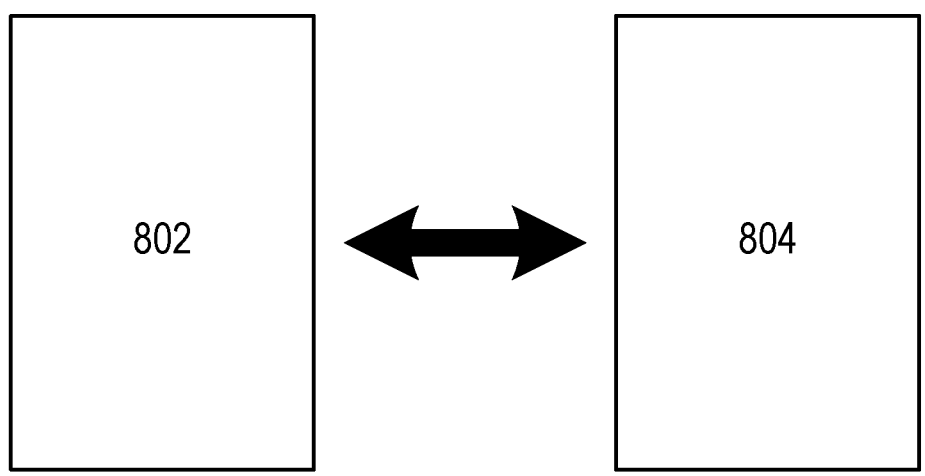
FIG. 8 is a schematic illustration of a processor in communication with a computer-readable medium.

According to a third aspect, the present invention provides a computer program product. FIG. 8 is a schematic illustration of an example of a processor 802 in communication with a computer-readable medium 804. According to various bodies, a computer program product may comprise a non-transitory computer-readable medium 804, the computer-readable medium having computer-readable code embodied therein, the computer-readable code being configured such that, on execution by a suitable computer or processor 802, the computer or processor is caused to perform steps of the methods and 600, 700 disclosed herein. The processor 802 may comprise or be similar to the processors 118, 202 discussed above.

Figure 9:
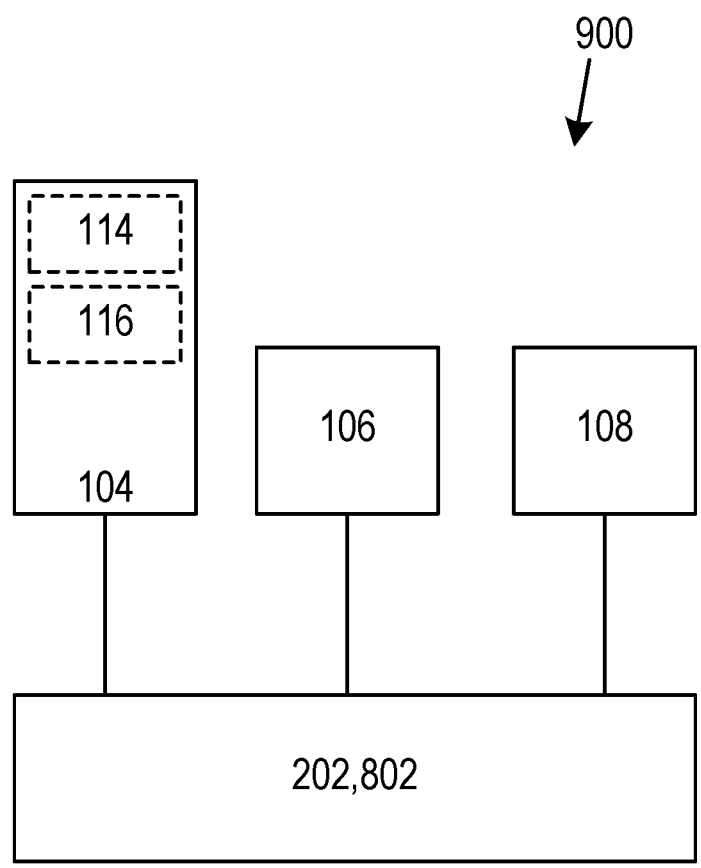
FIG. 9 is a schematic illustration of a personal care system.

According to a fourth aspect, the present invention provides a personal care system. FIG. 9 is a schematic illustration of an example of a personal care system 900. The personal care system 900 comprises a personal care device 104 having a treatment element 112 to be used to treat a portion of a user 102. The personal care system 900 also comprises an image capture device 108 configured to capture image data in respect of the user of the personal care device 104. The image capture device 108 may, for example, comprise a 2D or 3D camera. The personal care system 900 also comprises a display unit 106 (e.g. the display of an interactive mirror or of a computing device). The personal care system 900 also comprises processing apparatus 202, 802. The processing apparatus 118, 202, 802, the display unit 106 and/or the image capture device 108 may form part of a single unit or component, such as a computing device or an interactive mirror. The personal care device 104, the display unit 106 and the image capture device 108 may all be in communication with the processing apparatus 118, 202, 802, for example via a wired or wireless connection.

The processing apparatus 118, 202, 802 is configured to operate the image capture device 108 to capture image data in respect of the user 102 of the personal care device 104, receive device operating data relating to the personal care device, determine position information of at least the treatment element 112 of the personal care device relative to the user, generate, based on the captured image data, the received device operating data and the determined position information, an image representative of a predicted appearance of the portion of the user following treatment using the personal care device, and provide the generated image for display on a representation of the user on the display unit.

In some embodiments, the personal care device 104 may comprise a first sensor 114 configured to measure a force or pressure applied to the user 102 by the personal care device 104. For example, the personal care device 104 may comprise a resistance sensor, a capacitance sensor and/or a piezoelectric sensor to measure a force applied to skin of the user 102 by the treatment element 112 of the personal care device during use. The processing apparatus 118, 202, 802 may be configured to generate the image 120 representative of the predicted appearance of the portion of the user 102 further based on an output of the first sensor 114.

In some embodiments, the personal care device 104 may comprise a second sensor 116 configured to measure orientation data and/or motion data in respect of the personal care device. For example, the personal care device 104 may comprise one or more of an accelerometer, and magnetometer, a gyroscope and an inertial measurement unit (IMU), configured to measure an orientation of the personal care device (e.g. relative to Earth) and/or data relating to any movement of the personal care device during use. The processing apparatus 118, 202, 802 may be configured to generate the image 120 representative of the predicted appearance of the portion of the user 102 further based on an output of the second sensor 116.

As noted above, the invention a be used in the field of personal care, or any field where a treatment is to be performed in respect of the user. In some embodiments, the personal care device 104 may comprise a device selected from a group comprising: a hair trimming device, a shaving device, a hair treatment device, a photoepilation device, a skin treatment device, a skin rejuvenation device and a product application device (e.g. a device for applying product such as cream, lotion, make up and the like) to a user.

Embodiments of the invention disclosed herein provide a mechanism by which a user may view and anticipate the likely effect of performing a personal care activity before the activity is actually performed. This is achieved by predicting an appearance of part of the user if the personal care activity were performed, and displaying an image depicting the predicted appearance to the user prior to the performance of the activity. In this way, a user may make an informed decision regarding whether or not to proceed with the personal care activity. Moreover, with foresight of the likely outcome of performing a personal care activity, the user may perform the personal care activity more accurately and quicker, reducing the power used by a personal care device, and reducing wear of components of the personal care device (e.g. the treatment element).

The processor 118, 202, 802 can comprise one or more processors, processing units, multi-core processors or modules that are configured or programmed to control the apparatus 200 in the manner described herein. In particular implementations, the processor 118, 202, 802 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus comprising:
   a processor configured to
      receive image data in respect of a user of a personal care device, wherein the personal care device is to be used to treat a portion of the user;
      receive device operating data relating to the personal care device, wherein the device operating data comprise data indicative of an orientation and/or a motion of the personal care device;
      determine position information of at least a treatment element of the personal care device relative to the user;
      generate, based on the received image data, the received device operating data and the determined position information, an image representative of a predicted appearance of the portion of the user following treatment using the personal care device;
      generate the image representative of the predicted appearance of the portion of the user having a size based on the orientation/motion data; and
      provide the generated image for display on a representation of the user.

2. The apparatus according to claim 1, wherein the processor is further configured to:
   determine, based on the received image data, a degree of deformation of a surface of the user by the personal care device; and
   generate the image representative of the predicted appearance of the portion of the user further based on the determined degree of deformation of the surface of the user.

3. The apparatus according to claim 1, wherein the processor is configured to generate the image representative of the predicted appearance of the portion of the user further based on an output of a sensor of the personal care device.

4. The apparatus according to claim 1, wherein the processor is further configured to:
   determine, based on the received image data, an indication of the body part of the user that is to be treated using the personal care device; and
   generate the image representative of the predicted appearance of the portion of the user having a size based further on the indication of the body part.

5. The apparatus according to claim 1, wherein the apparatus comprises an interactive mirror, a desktop computer, a laptop computer, a tablet computer, a smartphone or a wearable device.

6. A computer-implemented method comprising:
   receiving image data in respect of a user of a personal care device, wherein the personal care device is to be used to treat a portion of the user;
   receiving device operating data relating to the personal care device, wherein the device operating data comprise data indicative of an orientation and/or a motion of the personal care device;
   determining position information of at least a treatment element of the personal care device relative to the user;
   generating, based on the received image data, the received device operating data and the determined position information, an image representative of a predicted appearance of the portion of the user following treatment using the personal care device;

generating the image representative of the predicted appearance of the portion of the user having a size based on the orientation/motion data; and display the generated image on a representation of the user.

7. The computer-implemented method according to claim 6, further comprising:

displaying the representation of the user and the generated image on the representation of the user in an alternating manner.

8. The computer-implemented method according to claim 6, further comprising:

determining, based on the received image data, an amount of deformation of a surface of the user by the personal care device wherein generating the image representative of the predicted appearance of the portion of the user is further based on the determined amount of deformation of the surface of the user.

9. The computer program product comprising a non-transitory computer-readable medium, the computer-readable medium having computer-readable code embodied therein, the computer-readable code being configured such that, on execution by a suitable computer or processor, the computer or processor is caused to perform the method of claim 6.

10. A personal care system comprising:

a personal care device having a treatment element to be used to treat a portion of a user;

an image capture device configured to capture image data in respect of the user of the personal care device;

a sensor configured to measure orientation data and/or motion data in respect of the personal care device;

a display unit; and processing apparatus configured to:
 operate the image capture device to capture image data in respect of the user of the personal care device;
 receive device operating data relating to the personal care device;
 determine position information of at least the treatment element of the personal care device relative to the user;
 generate, based on the captured image data, the received device operating data and the determined position information, an image representative of a predicted appearance of the portion of the user following treatment using the personal care device; and
 provide the generated image for display on a representation of the user on the display unit, wherein the processing apparatus is configured to generate the image representative of the predicted appearance of the portion of the user further based on an output of the second sensor.

11. The personal care system according to claim 10, wherein the personal care device comprises:

another sensor configured to measure a force or pressure applied to the user by the personal care device; and wherein the processing apparatus is configured to generate the image representative of the predicted appearance of the portion of the user further based on an output of the other sensor.

12. The personal care system according to a claim 10, wherein the personal care device comprises a device selected from a group comprising:

a hair trimming device, a shaving device, a hair treatment device, a photoepilation device, a skin treatment device, a skin rejuvenation device and a product application device.

13. An apparatus comprising:

a processor configured to:
 receive image data in respect of a user of a personal care device, wherein the personal care device is to be used to treat a portion of the user;
 receive device operating data relating to the personal care device;
 determine position information of at least a treatment element of the personal care device relative to the user;
 generate, based on the received image data, the received device operating data and the determined position information, an image representative of a predicted appearance of the portion of the user following treatment using the personal care device; and
 provide the generated image for display on a representation of the user, wherein the device operating data comprises a size of the treatment element of the personal care device;
 generate the image representative of the predicted appearance of the portion of the user having a size based on the size of the treatment element, wherein the device operating data comprises a size of the treatment element of the personal care device; and
 generate the image representative of the predicted appearance of the portion of the user having a size based on the size of the treatment element.

14. The apparatus according to claim 13, wherein the processor is further configured to:

determine, based on the received image data, a degree of deformation of a surface of the user by the personal care device; and generate the image representative of the predicted appearance of the portion of the user further based on the determined degree of deformation of the surface of the user.

15. The apparatus according to claim 13, wherein the processor is further configured to generate the image representative of the predicted appearance of the portion of the user further based on an output of a sensor of the personal care device.

16. The apparatus according to claim 13, wherein the device operating data comprise data indicative of an orientation and/or a motion of the personal care device, wherein the processor is configured to generate the image representative of the predicted appearance of the portion of the user having a size based on the orientation/motion data.

17. The apparatus according to claim 13, wherein the processor is further configured to:

determine, based on the received image data, an indication of the body part of the user that is to be treated using the personal care device; and generate the image representative of the predicted appearance of the portion of the user having a size based further on the indication of the body part.

18. An apparatus according to claim 13, wherein the apparatus comprises an interactive mirror, a desktop computer, a laptop computer, a tablet computer, a smartphone or a wearable device.

* * * * *